Patented Mar. 30, 1937

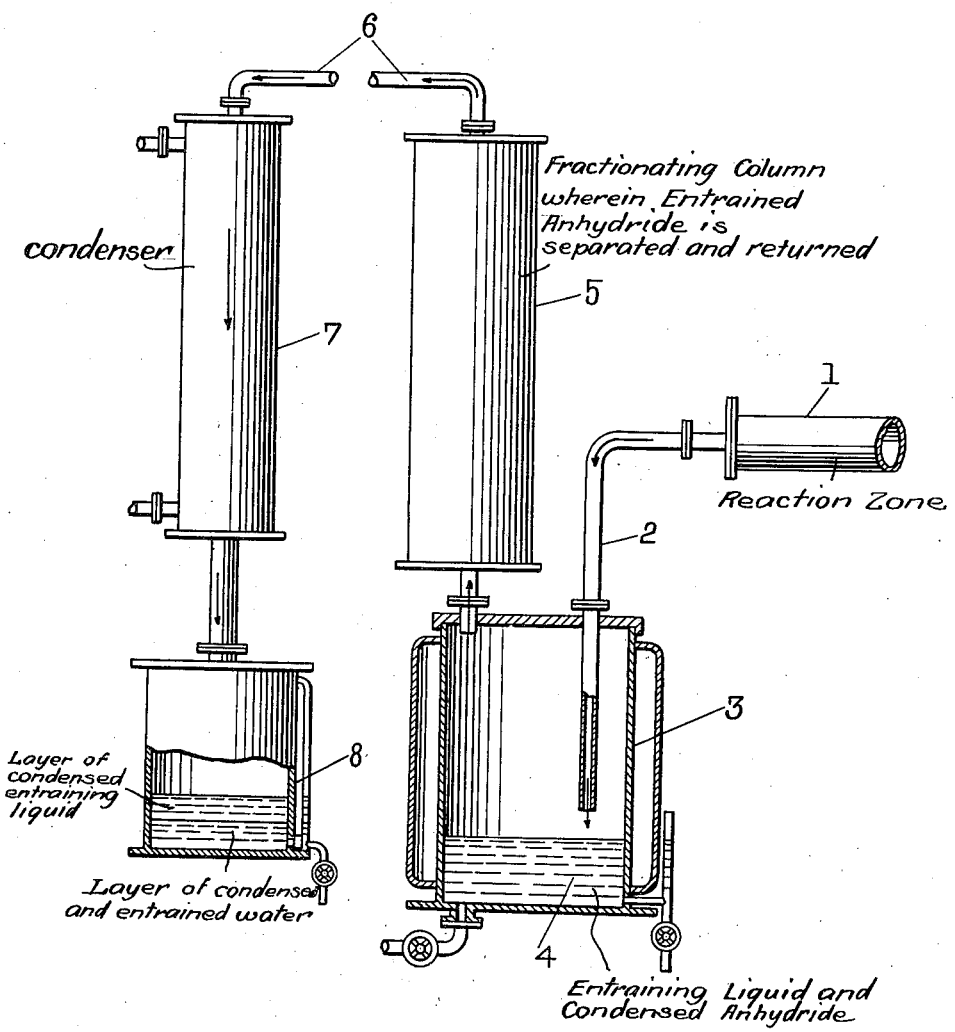

2,075,026

UNITED STATES PATENT OFFICE 2,075,026

MANUFACTURE OF ALIPHATIC ANHYDRIDES

Henry Dreyfus, London, England, and Clifford Ivan Haney, Drummondville, Quebec, Canada, assignors to Celanese Corporation of America, a corporation of Delaware Application June 11, 1928, Serial No. 284,566
In Great Britain July 7, 1927

9 Claims. (Cl. 260—123)

This invention relates to the manufacture of aliphatic anhydrides from aliphatic acids and especially to the manufacture of acetic anhydride from acetic acid.

It was shown by Peytral (Bulletin de la Société Chimique de France XXXI pages 113–118) that acetic anhydride can be produced by passing glacial acetic acid vapours through platinum tubes heated to high temperatures such as up to 1150° C. In this process a yield of about 2% of acetic anhydride was obtained, and the quantity of decomposition products formed, such as gases, as given by Peytral was very small or unsubstantial, most of the vapours from the reaction being recovered as acetic acid on condensation, though statements to the contrary have been made in literature of later date.

We have found that aliphatic acids are split into their anhydrides at relatively high or high temperatures to a very substantial degree or even quantitatively, but that if these hot reaction gases or vapours are subjected to simple condensation the anhydride is very largely hydrolyzed back to the aliphatic acid. Thus in the manufacture of aliphatic anhydrides from aliphatic acids by pyrogenic decomposition the important step upon which good yields depend is rather the separation of the anhydride from the reaction gases or vapours and not (as has hitherto been thought the case) the use of particular temperatures or particular catalysts in the pyrogenic decomposition.

The object of the present invention is to provide a process for obviating to a large extent or eliminating the hydrolysis and loss of anhydride in the separation or recovery thereof.

According to the present invention we subject the vapours of aliphatic acids (and especially acetic acid) to pyrogenic decomposition in any suitable way and separate the anhydride so formed by condensation from the water vapour whilst carrying away the water vapour by the vapour of one or more entraining liquids. By this means the anhydride is substantially condensed and the water is entrained with the vapour of entraining liquid.

In performing the invention we preferably mix the reaction gases or vapours after leaving the hot reaction zone, with the vapours of the entraining liquid or liquids, at a temperature below the boiling point (under the conditions of pressure obtaining) of the anhydride. Conveniently the reaction gases or vapours which should not be allowed to cool down below the boiling point of water before becoming mixed with the vapours of the entraining liquid or liquids, may be introduced into a vessel up which the vapours of the entraining liquid or liquids are caused to rise, whereby the anhydride is condensed to a very substantial degree and the water carried off by the vapours of the entraining liquid or liquids. In such form of execution the vapours of the entraining liquid or liquids carrying water vapour are preferably treated to recover any anhydride carried over; and for this purpose they may be caused to pass from the vessel up through a fractionation column (whereby any entrained anhydride is largely condensed and returned to the vessel) and be caused to pass thence through a condenser and the condensate be treated to recover acetic anhydride entrained past the fractionating column.

If desired some of the vapour of the entraining liquid or liquids may be mixed with the reaction gases or vapours at temperatures above the boiling point of the anhydride, for instance, immediately on their leaving the hot reaction zone.

Further, if desired, all of the vapour of the entraining liquid or liquids may be added to the reaction gases or vapours at temperatures above the boiling point of the anhydride, for instance immediately on their leaving the hot reaction zone; the anhydride in such cases being separated by cooling the resulting mixture to temperatures below the boiling point of the anhydride whilst removing the water vapour by the vapour of the entraining liquid or liquids.

Further, if desired, vapour of the entraining liquid or liquids may be added to the aliphatic acid vapour prior to or during the subjection of the same to pyrogenic decomposition, the anhydride in such cases being separated from the reaction gases or vapours by any of the methods above described, whether or not vapours of the entraining liquid or liquids are added to the reaction gases or vapours subsequent to their leaving the hot reaction zone.

As examples of entraining liquids which we may use for the purposes of the invention may be mentioned benzene, carbon tetrachloride, petrol, mixtures of two or more of such bodies, or mixtures of ether with petroleum ether; it will be understood however that any other liquids chemically inert to the anhydride and having a high entraining capacity for water may be employed. The liquids should preferably have a low entraining capacity for the anhydride.

The accompanying drawing serves to illustrate, in diagrammatic form, a means for carrying out the invention, it being understood that this is given by way of illustration only and in no way as limitative.

Referring to the drawing, the gases or vapours from the hot reaction zone 1 are passed through the pipe 2 into the steam jacketed vessel 3, in which a quantity of benzene 4 is kept at the boil, the level of the liquid in the vessel 3 being kept below the end of the pipe 2. The reaction gases or vapours before actually entering the vessel 3 are kept at a temperature above the boiling point of water, for instance, especially when manufacturing acetic anhydride by the process, at a temperature of from about 110° to 140° C.

On entering the vessel 3 a large proportion of the anhydride becomes condensed and mixes with the boiling benzene, whilst the water vapour and some of the anhydride are entrained by the benzene vapour and pass up into the fractionating column 5, the trays or sections of which are kept at temperatures approximating the boiling point of benzene e. g. about 78° C. A large proportion of any entrained anhydride is separated in the fractionating column and falls back into the vessel 3. From the column 5 the vapours pass via the pipe 6 to the condenser 7 and the benzene and water (together with any anhydride entrained past the condenser) collect in the receiver 8. The liquid in the receiver separates into two layers, one of which is composed chiefly of benzene and entrained anhydride and the other layer chiefly of water. The anhydride collected in the vessel 3 may readily be freed from benzene by distillation. Similarly the benzene layer from the receiver 8 may be subjected to distillation to recover the anhydride. Or it may be returned by any suitable means to the vessel 3 for the treatment of the reaction gases or vapours; for instance it may be returned by means of a Florentine bottle as commonly employed in the manufacture of acetic anhydride.

The pyrogenic decomposition of the aliphatic acid vapours for the purpose of the present invention may be performed in any known or suitable manner in presence of catalysts if desired, though the use of catalysts is not necessary. We prefer to perform the pyrogenic decomposition by passing the aliphatic acid vapour through silica, earthenware, copper or other tubes heated to temperatures of from about 500° to 1200° and preferably 800° to 900° C. The higher the temperature the higher should be the speed of passage of the aliphatic acid vapour. Should it be desired to perform the pyrogenic decomposition of the aliphatic acid vapour in presence of catalysts, any catalysts known to promote the thermal or pyrogenic decomposition of aliphatic acids into their anhydrides may be employed.

It is to be understood that the invention is not limited in respect to the concentration of the aliphatic acid employed for the pyrogenic decomposition, as dilute as well as concentrated or "glacial" aliphatic acids may be employed; and the process provides inter alia valuable means for manufacturing acetic anhydride from dilute acetic acid such as result from the acetylation of cellulose and other industrial acetylation processes.

What we claim and desire to secure by Letters Patent is:—

1. Process for the manufacture of an aliphatic anhydride which comprises subjecting the vapor of an aliphatic acid to pyrogenic decomposition and separating the resulting anhydride from the water vapor by mixing the reaction vapors with the vapor of at least one entraining liquid at a temperature below the boiling point of anhydride but above the condensation point of water vapor and fractionating the resultant mixture.

2. Process for the manufacture of acetic anhydride which comprises subjecting the vapor of acetic acid to pyrogenic decomposition and separating the resulting acetic anhydride from the water vapor by mixing the reaction vapors with the vapor of at least one entraining liquid at a temperature below the boiling point of acetic anhydride but above the condensation point of water vapor and fractionating the resultant mixture.

3. Process for the manufacture of acetic anhydride which comprises subjecting the vapor of acetic acid to pyrogenic decomposition and separating the resulting acetic anhydride from the water vapor by mixing the reaction vapors with the vapor of benzene at a temperature below the boiling point of acetic anhydride but above the condensation point of water vapor and fractionating the resultant mixture.

4. Process for the separation of a vaporous mixture comprising an aliphatic anhydride and water vapor which comprises mixing with said mixture the vapor of at least one entraining liquid at a temperature below the boiling point of the anhydride, but above the condensation point of water vapor and fractionating the resultant mixture.

5. Process for the separation of a vaporous mixture comprising acetic anhydride and water vapor which comprises mixing with said mixture the vapor of at least one entraining liquid at a temperature below the boiling point of the anhydride, but above the condensation point of water vapor and fractionating the resultant mixture.

6. Process for the separation of a vaporous mixture comprising acetic anhydride and water vapor which comprises mixing with said mixture the vapor of benzene at a temperature below the boiling point of the anhydride, but above the condensation point of water vapor and fractionating the resultant mixture.

7. Process for the separation of a vaporous mixture comprising an aliphatic anhydride and water vapor, which comprises adding and mixing the vapor of at least one entraining agent to said mixture and condensing the anhydride while allowing the water to pass off in vapor form.

8. Process for the separation of a vaporous mixture comprising an acetic anhydride and water vapor, which comprises adding and mixing the vapor of at least one entraining agent to said mixture and condensing the anhydride while allowing the water to pass off in vapor form.

9. Process for the separation of a vaporous mixture comprising acetic anhydride and water vapor, which comprises adding and mixing the vapor of benzene to said mixture and condensing the anhydride while allowing the water to pass off in vapor form.

HENRY DREYFUS.
CLIFFORD IVAN HANEY.